United States Patent Office 3,463,830
Patented Aug. 26, 1969

3,463,830
HYDROGENATION WITH A ZEROVALENT PLATINUM OR PALLADIUM CATALYST
Robert William Dunning, Kamalakant Krishnarao Joshi, Alan Roger Oldham, and Michael Christopher Kenneth Willott, Runcorn, England, assignors to Imperial Chemical Industries Limited, London, England, a corporation of Great Britain
No Drawing. Filed July 20, 1967, Ser. No. 654,711
Claims priority, application Great Britain, Aug. 10, 1966, 35,787/66
Int. Cl. C07c 5/14; C07f 9/50, 15/00
U.S. Cl. 260—683.9                                  5 Claims

ABSTRACT OF THE DISCLOSURE

Process for the hydrogenation of an unsaturated organic substrate in homogeneous liquid media which comprises contacting the substrate with hydrogen in the presence of a zerovalent compound of platinum or palladium.

---

This invention relates to a process for the hydrogenation of organic compounds and especially to the homogeneous hydrogenation of acetylenes and olefins by means of platinum and palladium compounds.

It is known that compounds of divalent platinum can act as hydrogenation catalysts in homogeneous media. Cramer et al. (J.A.C.S. 85, 1691 (1963)) described the use of Pt (II) complexes with tin compounds for the hydrogenation of ethylene and acetylene. We have now found that zerovalent organic compounds of platinum and palladium also show hydrogenation activity in homogeneous media.

Accordingly, we provide a process for the hydrogenation of an unsaturated organic substrate in homogeneous liquid media which comprises contacting the substrate with hydrogen in the presence of a zerovalent compound of platinum or palladium. The process of the present invention is particularly useful for the hydrogenation of acetylenic and olefinic groups in organic compounds. By a zerovalent compound of platinum or palladium we mean one in which the metal apparently exhibits the zero oxidation state. Such compounds have been described in the following references: Malatesta, J.C.S. (1955, 3924; Malatesta et al., J.C.S. (1957) 1186; Malatesta et al., J.C.S. (1958), 2323; Malatesta et al., J.C.S. (1963), 2080; Chatt, Nature 191 (1961), 1191; Cross and Glocking, J.C.S. (1965), 5422; Chatt and Shaw, J.C.S. (1962), 3269; Krach and Baw, Angew. Chem. (1965), 505; Chatt et al., Proc. Chem. Soc. (1957), 208; and Allan and Cook, Proc. Chem. Soc. (1962), 218.

In these compounds co-ordinated ligands are present, which stabilise the zerovalent state of the metal. Preferred ligands for compounds used in the present invention are those containing Group V–B electron-donating atoms, especially phosphorus. Particularly suitable ligands are organic substituted phosphines, for example, triphenyl phosphine. Also, ligands derived from unsaturated hydrocarbon may be present, such as acetylenes, substituted acetylenes, or olefins such as norbornadiene and vinyl compounds.

The catalysts may be prepared by methods described in the literature, such as by reduction of platinum or palladium (II) compounds with hydrazine. Typically, dichlorobis(triphenyl phosphine) platinum (II) is warmed in ethanol with hydrazine and excess triphenyl phosphine when yellow crystals of tetrakis(triphenyl phosphine) platinum (0) separate out. If the triphenyl phosphine is omitted the co-ordinatively unsaturated tris(triphenyl phosphine) platinum (0) is obtained. If the reaction is carried out in the presence of an unsaturated hydrocarbon, the latter may be incorporated into the compound.

The hydrogenation process is carried out in the liquid phase. This may be readily accomplished by dissolving the catalyst in an inert solvent, and adding this solution to the substrate to be hydrogenated, which may be liquid under the prevailing conditions or may itself be in solution. Aromatic nuclei are not hydrogenated in the presence of catalysts of the type used in the process of the present invention. Thus aromatic hydrocarbons such as benzene may be used as solvents. Other solvents may be used if they are not reactive with the catalyst. Hydrogen is then applied at elevated pressure and temperature. For reasonably rapid reaction, the pressure should be 50 atmospheres or above, preferably 70 to 300 atmospheres and the temperature should be 100° C. or above, preferably 150 to 250° C.

The degree of hydrogenation may be determined by measuring the hydrogen uptake or by analysis of samples of substrates withdrawn successively from the reaction vessel.

The invention is illustrated by the following examples.

EXAMPLE 1

9.8 milligrams of tris(triphenyl phosphine) platinum (0) were dissolved in 2 ml. of benzene. 0.1 ml. of this solution was added to 5 ml. of benzene containing 10% by volume of each of hexyne-1 and octene-1. The solution was transferred to an autoclave vessel which was sealed and pressurised with hydrogen to 80 atmospheres. The contents were then heated to 175° C. when a pressure of 100 atmospheres was attained and conditions were held constant for 1 hour. After cooling and venting, the product was analysed by gas chromatography. Conversions:

|  | Percent |
|---|---|
| Hexyne-1 to hexane | 19 |
| Hexyne-1 to hexene-1 | 44 |
| Octene-1 to octane | 14 |

The experiment was repeated with no catalyst added: total conversion was less than 1%.

EXAMPLES 2–9

The procedure of Example 1 was repeated using different catalysts. The results are given in the table below, in which the catalysts are identified by example numbers as follows:

(2) bis(triphenyl phosphine) (acetylene) platinum (0)
(3) bis(triphenyl phosphine) (acrylonitrile) platinum (0)
(4) bis(triphenyl phosphine) (methyl vinyl ketone) platinum (0)

(5) bis(triphenyl phosphine) (norbornadiene) platinum (0)
(6) bis(triphenyl phosphine) (maleic anhydride) platinum (0)
(7) bis(triphenyl phosphine) (phenyl acetylene) platinum (0)
(8) tetrakis(triphenyl phosphine) palladium (0)
(9) bis(triethyl phosphine) (tetracyanoethylene) platinum (0).

| Example and catalyst No. | Amount (mg.) | Conversion, percent by weight | | |
|---|---|---|---|---|
| | | Hexyne-1 to Hexane | Hexyne-1 to Hexene-1 | Octene-1 to octane |
| 2 | 7.5 | 11 | 73 | 3 |
| 3 | 7.7 | 23 | 72 | 16 |
| 4 | 7.9 | 22 | 78 | 16 |
| 5 | 8.1 | 20 | 78 | 13 |
| 6 | 8.2 | 48 | 52 | 39 |
| 7 | 8.4 | 27 | 33 | 27 |
| 8 | 11.5 | 40 | 60 | 35 |
| 9 | 4.8 | 7 | 83 | 4 |

What we claim is:
1. Process for the hydrogenation of an unsaturated hydrocarbon substance in inert homogeneous liquid media which comprises contacting the substrate with hydrogen in the presence of, as catalysts, a zerovalent compound of platinum or palladium which contains one or more organic substituted phosphine ligands dissolved in said liquid media.
2. Process according to claim 1 in which the hydrocarbon substrate contains one or more acetylenic or olefinic groups.
3. Process according to claim 1 which is carried out at a temperature of 100° C. or above and at a hydrogen pressure of 50 atmospheres or greater.

4. Process according to claim 3 which is carried out at a temperature in the range 150–250° C. and at a pressure of hydrogen in the range 70–300 atmospheres.
5. A process according to claim 1 wherein the catalyst is selected from the group consisting of
tris(triphenyl phosphine) platinum (0);
bis(triphenyl phosphine) (acetylene) platinum (0);
bis(triphenyl phosphine) (acrylonitrile) platinum (0);
bis(triphenyl phosphine) (methyl vinyl ketone) platinum (0);
bis(triphenyl phosphine) (norbornadiene) platinum (0);
bis(triphenyl phosphine) (maleic anhydride) platinum (0);
bis(triphenyl phosphine) (phenyl acetylene) platinum (0);
tetrakis(triphenyl phosphine) palladium (0); and
bis(triethyl phosphine) (tetracyanoethylene) platinum (0).

References Cited

UNITED STATES PATENTS

| | | | |
|---|---|---|---|
| 3,110,747 | 11/1963 | Mullineaux | 260—683.9 |
| 3,130,237 | 4/1964 | Wald | 260—683.9 |
| 3,270,087 | 8/1966 | Heck | 260—683.9 |
| 3,324,018 | 6/1967 | Fotis et al. | 260—683.9 |
| 3,366,646 | 1/1968 | Dewhirst | 260—683.9 |

HERBERT LEVINE, Primary Examiner

U.S. Cl. X.R.

252—431, 437, 472; 260—677, 683